J. Morton.
Cutting Saw-Teeth.
Nº 75563. Patented Mar. 17, 1868.

Witnesses:
W. C. Ashkettle
J. A. Fraser

Inventor:
Jas. Morton
per Munn & Co.
Attorneys

United States Patent Office.

JAMES MORTON, OF PHILADELPHIA, PENNSYLVANIA.

Letters Patent No. 75,563, dated March 17, 1868.

---

IMPROVEMENT IN CUTTING SAW-TEETH.

---

The Schedule referred to in these Letters Patent and making part of the same.

---

TO ALL WHOM IT MAY CONCERN:

Be it known that I, JAMES MORTON, of Philadelphia, in the county of Philadelphia, and State of Pennsylvania, have invented a new and improved Machine for Cutting Saw-Teeth; and I do hereby declare that the following is a full, clear, and exact description thereof, which will enable others skilled in the art to make and use the same, reference being had to the accompanying drawings, forming part of this specification.

Figure 3 is a detail plan view of the same.

Similar letters of reference indicate corresponding parts.

This invention relates to a new machine for cutting the teeth of saw-blades, curry-combs, or other metal plates, and consists in the use of two revolving circular dies, between which the article to be toothed is fed. The dies are provided with toothed peripheries, the teeth being shaped according to the pattern to be cut. The dies are mounted on parallel shafts, with their toothed edges above each other, so that the tooth on one die will be over a recess in the other die, and vice versa. By revolving the two dies in opposite directions, the blade will be fed through, and the desired teeth cut into it by the opposite dies.

The object of this invention is to overcome the ordinary method of stamping, and to produce more accurate and exact workmanship than could be made by hand.

Figure 2:
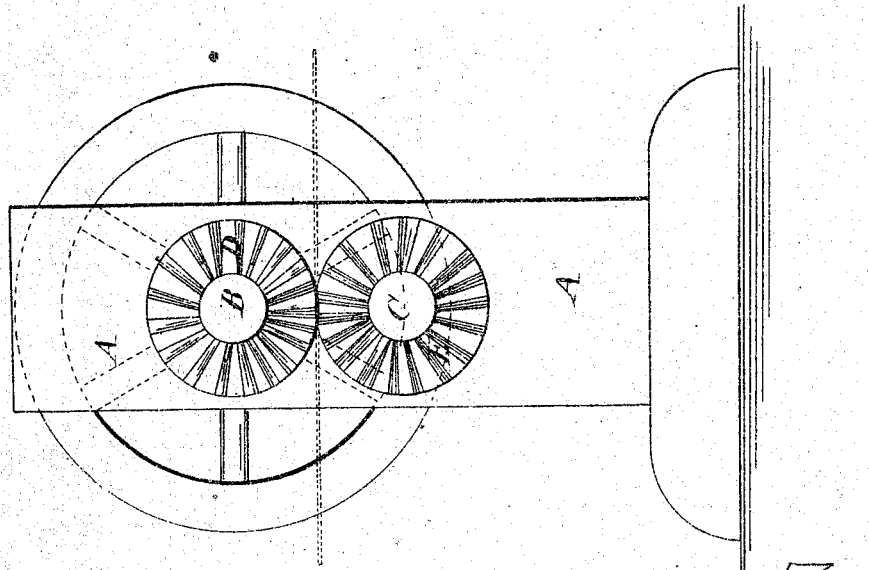
Figure 2 is a front elevation of the same.
Figure 1:
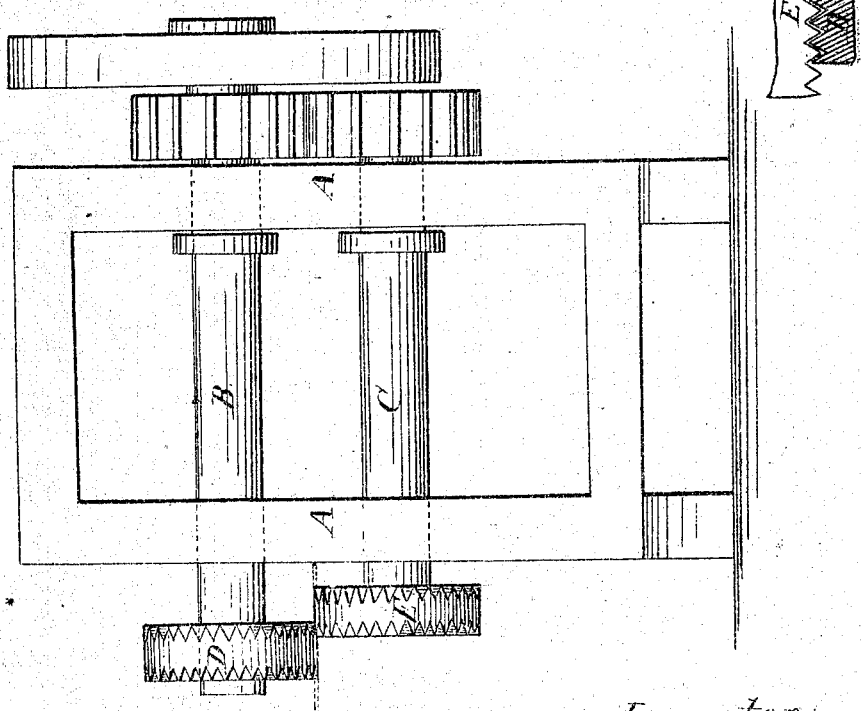
Figure 1 represents a side elevation of my improved tooth-cutting machine.

A, in the drawing, represents a frame, of suitable size, construction, and material. In the same are the bearings for two parallel shafts B and C, which carry at their ends circular heads D and E, respectively, as is clearly shown in figs. 1 and 2. The shafts B and C are geared together, so that they revolve in opposite directions when they receive rotary motion from suitable mechanism. The edges of the dies are toothed, as shown, the teeth being shaped in the required manner. The dies are set, one above the other, so that the toothed edges overlap, as shown in figs. 1 and 3. The dies are so arranged that a tooth on one is always opposite to a recess, fig. 3; in fact the dies are set sothat they gear into each other, the teeth fitting slightly into the opposite recesses. When a sheet-metal plate is introduced between the dies, the teeth of both dies will, by fitting into the opposite dies, cut with their edges through the blade, and the same will therefore be divided by a zigzag incision into two strips, of which each will have the required toothed edge, or the plate is so fed between the dies that its edge is only toothed, when triangular portions will be cut out.

The teeth may be sharp, V-shaped, as shown, or rounded, or of other suitable shape.

I claim as new, and desire to secure by Letters Patent—

A tooth-cutting machine, consisting of the two toothed revolving circular dies D and E, geared together and moving in opposite directions, substantially as herein shown and described.

JAMES MORTON.

Witnesses:
MARY MONTGOMERY MORTON,
REBECCA E. MORTON.